United States Patent [19]

Schaeffer et al.

[11] Patent Number: 5,210,771
[45] Date of Patent: May 11, 1993

[54] MULTIPLE USER SPREAD-SPECTRUM COMMUNICATION SYSTEM

[75] Inventors: Dennis R. Schaeffer; Michael D. Kotzin, both of Buffalo Grove, Ill.

[73] Assignee: Motorola, Inc., Schaumburg, Ill.

[21] Appl. No.: 739,037

[22] Filed: Aug. 1, 1991

[51] Int. Cl.$^5$ .............................................. H04K 1/00
[52] U.S. Cl. ........................................................ 375/1
[58] Field of Search ............................................ 375/1

[56] References Cited

U.S. PATENT DOCUMENTS

| | | | |
|---|---|---|---|
| 3,706,933 | 12/1972 | Bidell et al. | 375/1 |
| 4,532,636 | 6/1985 | Wilkinson | 375/1 |
| 4,638,479 | 1/1987 | Alexis . | |
| 4,653,069 | 3/1987 | Roeder | 375/1 |
| 4,665,404 | 5/1987 | Christy et al. | 375/1 |
| 4,817,089 | 3/1989 | Paneth et al. . | |
| 4,821,120 | 4/1989 | Tomlinson | 375/1 |
| 4,866,710 | 9/1989 | Schaeffer . | |
| 4,943,974 | 7/1990 | Motamedi | 375/1 |
| 4,972,506 | 11/1990 | Uddenfeldt . | |
| 5,029,183 | 7/1991 | Tymes | 375/1 |
| 5,067,136 | 11/1991 | Arthur et al. | 375/1 |
| 5,093,840 | 3/1992 | Schilling | 375/1 |
| 5,101,501 | 3/1992 | Gilhousen et al. | 375/1 |
| 5,103,460 | 4/1992 | Stewart | 375/1 |
| 5,109,390 | 4/1992 | Gilhousen et al. | 375/1 |
| 5,128,959 | 7/1992 | Bruckert | 375/1 |
| 5,131,006 | 7/1992 | Kamerman et al. | 375/1 |

OTHER PUBLICATIONS

Fred Baumgartner, "Code Division Multiple Access Beyond the Time Domain", *Communications* Feb. 1990; pp. 26-32.

*Primary Examiner*—David Cain
*Attorney, Agent, or Firm*—Raymond J. Warren

[57] ABSTRACT

A communication system having a site employing a plurality of communication channels. Each channel is assigned a desired received signal strength threshold. A channel is assigned to a subscriber unit based upon the strength of the signal received at the site and the power control range of the subscriber unit. The selection of a channel may be performed either by the site or the subscriber unit. In an FDMA environment, each separate frequency division channel may be assigned different received signal strength thresholds. In a non-overlapping time interval (TDMA) environment, each separate time division channel may be assigned different received signal strength thresholds. In another embodiment, a combination of FDMA and TDMA environments can be used.

38 Claims, 2 Drawing Sheets

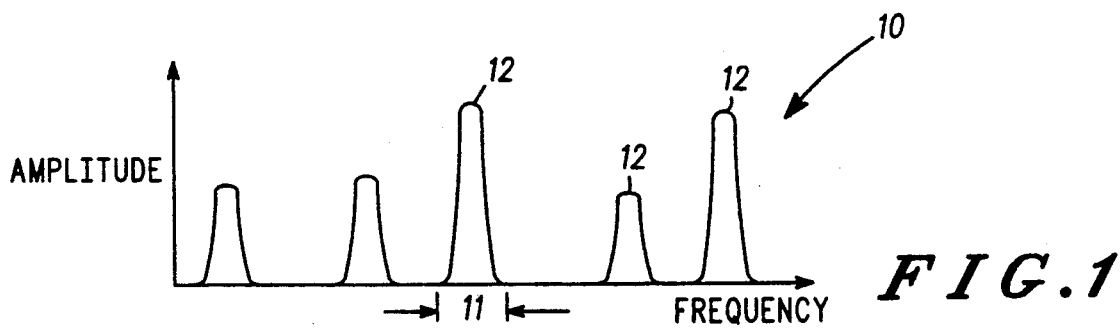
FIG.1 — PRIOR ART —
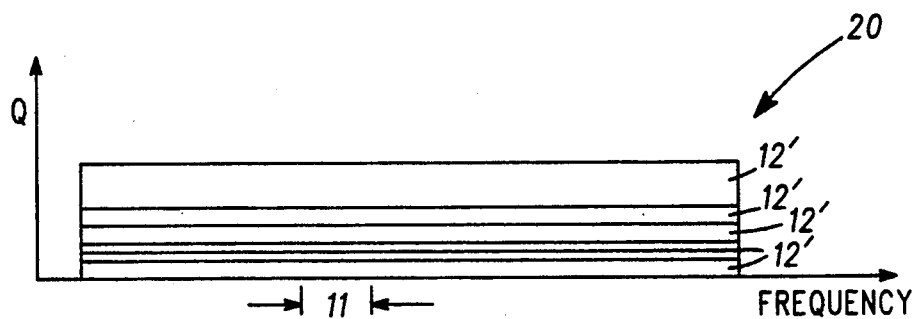
FIG.2 — PRIOR ART —
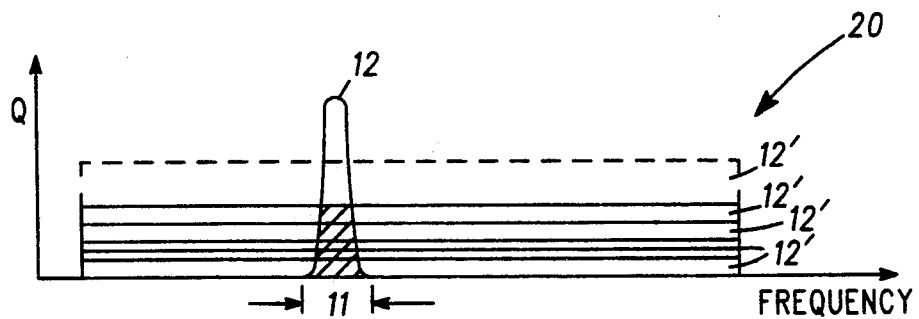
FIG.3 — PRIOR ART —
FIG.4
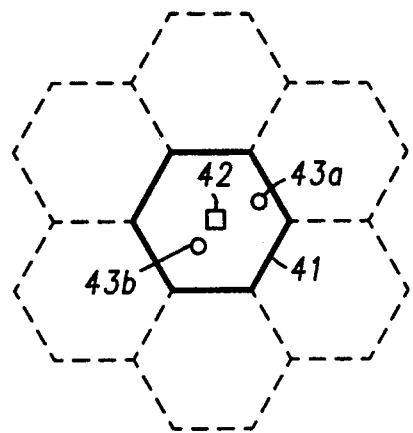
FIG.6
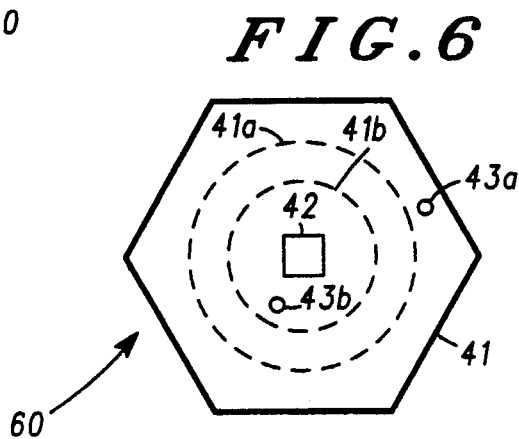

MULTIPLE USER SPREAD-SPECTRUM COMMUNICATION SYSTEM

FIELD OF THE INVENTION

The present invention relates, in general, to spread-spectrum communication systems and, more particularly, to a multiple user spread-spectrum communication system.

BACKGROUND OF THE INVENTION

The purpose of a communication system is to transmit information-bearing signals from a source (transmitter) to a destination (receiver) using a channel. The transmitter processes (modulates) the message signal into a form suitable for transmission over the channel. The receiver then demodulates the received signal to produce an estimate of the original message signal.

In any communication system, a key parameter which impacts system performance is the transmitter power. In a noise limited communication system, the transmitted power determines the allowable separation between the transmitter and receiver. The available transmitted power determines the signal-to-noise ratio at the receiver input which, for successful communication of information to occur, must exceed some prescribed threshold.

Another key performance criterion for certain communication systems relates to the number of simultaneous users that can be accommodated. An example of one well known system application is a cellular radio telephone system. Such systems are, typically, comprised of a number of base sites, each having a service coverage area, and a number of mobile or hand portable cellular telephones (hereinafter referred to as "subscribers"). The service coverage areas of base sites may be arranged to partially overlap in such a manner as to provide a substantially continuous coverage area in which a subscriber communication unit receiving service from one base site may be handed off to an adjacent remote site with no interruption in service. It is a key goal for a cellular communication system to effectively utilize the available spectrum so that as many users as possible can be accommodated.

Signal multiplexing permits the simultaneous radio transmission of signals from several message sources over a common spectral resource. Frequency division multiplex, time division multiplex, and mixtures thereof have traditionally been used for implementing cellular radio systems.

In a frequency division multiplex (FDM) system, the communication spectral resource is divided into several narrow frequency bands. For at least the time needed to communicate the desired traffic, one frequency division channel is occupied by the subscriber for communicating to the base site. Another frequency channel is used for traffic from the base site to the subscriber.

Time-division multiplex (TDM) systems are another type of multiple access communication system. In a TDMA system, the spectral resource is divided into repeating time frames each having a plurality of time slots or time division channels. Each time division channel is assigned to a different communication link. In this scheme, a portion of a subscriber's information occurs during an assigned slot of a frame. This is followed by one or more other time slots where information to or from other subscribers is accommodated. This process is repeated with received information being appropriately reconstructed at the receiver.

Both analog and digital transmission methods are used to transmit a message signal over a communication channel. Of recent, digital methods have become preferred due to several operational advantages over analog methods, including, inter alia: increased immunity to channel noise and interference; flexible operation of the system; common format for the transmission of different kinds of message signals; improved security of communications through the use of digital encryption; and increased capacity.

To transmit a message signal (either analog or digital) over a band-pass communication channel, the message signal must be manipulated into a form suitable for efficient transmission. Modification of the message signal is achieved by means of modulation and numerous suitable methods are well known in the art. Correspondingly, a receiver is required to recreate the original message.

Spread spectrum communication systems utilizing code division multiple access (CDMA) techniques can be used as multiple access systems like FDMA and TDMA systems. In a spread spectrum system a modulation technique is utilized in which the information is spread over a wide frequency band. The frequency band is much wider than the minimum bandwidth required to transmit the information being sent.

In a direct sequence CDMA system, communication between two communication units is accomplished by spreading each transmitted signal over a wide frequency band with a unique user spreading code. As a result, a multiplicity of transmitted signals share the same frequency. The ability of such a system to work is based on the fact that each signal is specially time and/or frequency coded to facilitate its separation and reconstruction at the receiver. Particular transmitted signals are retrieved from the communication channel by despreading a signal from the sum of signals in the communication channel with a known user spreading code related to the particular spreading accomplished at the transmitter.

In the digital direct sequence system, radio carrier modulation is performed after spreading the user's information with a digital code sequence whose bit rate is much higher than the information rate. A pseudo-random number (PN) is used as a code to "spread" the spectrum. The receiver, by utilizing the same known PN, can properly decode the received signal—even when corrupted with other user's spread signals—and reproduce the original information. The number of simultaneous users that can be accommodated in such a system is dependent on the amount of spectrum "spreading" that is implemented.

Another type of spread spectrum communication is "frequency hopping". In frequency hopping, the frequency of the carrier is shifted using a pattern dictated by a code sequence. The transmitter jumps from one frequency to another within some predetermined set. At the receiver, the hopping sequence for the desired user is known and allows tracking of the user's hopping transmissions. Periodically, more than one user's signal will fall on the same frequency thereby causing interference. Information coding techniques (error correction coding) are used to enable reconstruction of the original information even when a fraction of the transmitted bursts are lost. There are also time hopping and time-frequency hopping schemes whose times transmission are regulated by the code sequence.

Any of the multiple access systems can be utilized cellular radio communication systems. In cellular systems, several factors limit performance. Typically, in propagating through the channel, a transmitted signal is distorted because of nonlinearities and imperfections in the frequency response of the channel. Other sources of degradation are noise (thermal and man made) and adjacent and co-channel interference.

Besides the typical sources of degradation mentioned above, the majority of the noise associated with a received signal in a spread spectrum CDMA system comes from the other user's signals which are transmitted in the same frequency band but with unique user spreading codes. A noise power contribution to the desired despread signal exists for each of the other individual user's signals. The magnitude of the added noise is directly related to the received signal power of each of the undesired signals. An undesired received signal that comes in much stronger than the desired signal contributes excess noise. Therefore, it is desirable to dynamically adjust the power of all users in such a way that they are received with approximately the same power. In this manner, the number of users that can be simultaneously accommodated with the same spectrum resource is maximized.

In typical applications, to accomplish the needed power control, it would be necessary for the closest transmitters to reduce their power by as much as 80 dB when compared to the power of the furthest transmitters. This range in power control is extremely difficult to achieve and highly cost prohibitive.

Therefore, a means is needed by which communication using a spread spectrum format may be optimized without the requirement of an 80 dB power range.

SUMMARY OF THE INVENTION

The present invention comprises a multiple user spread-spectrum communication system having a site employing a plurality of communication channels. Each channel is assigned a desired received signal strength threshold. Subscriber units are assigned to appropriate channels based upon their received signal strength in a manner to permit their operation within their limited power control range. The subscriber units achieve this threshold by dynamically adjusting their transmit power.

In a particular embodiment, after a signal has been initially received from a subscriber unit and the power measured, the system selects a channel having an assigned received signal strength threshold for the subscriber signal that is compatible with the subscriber's dynamic power control range. The subscriber unit is instructed to transmit on the selected channel. Once assigned to a particular channel, the output power of the subscriber's transmitter is adjusted to match the received signal strength threshold assigned to that channel.

In another particular embodiment, the communication channel comprises non-overlapping time division channels of one or more radio frequency carriers.

In yet another particular embodiment of the present invention, the above communication system may be applied using channels employing a combination of frequency and non-overlapping time divisions, each being assigned to different power levels.

BRIEF DESCRIPTION OF THE DRAWINGS

FIG. 1 is a graph representing a prior art FDMA communication scheme;

FIG. 2 is a graph representing a prior art spread spectrum communication scheme;

FIG. 3 is an abstract representation of a reconstructed communication signal from the prior art spread spectrum communication scheme;

FIG. 4 is a graphical representation of a cell site;

FIG. 6 is a graphical representation of a cell site using the spread spectrum scheme of FIG. 5;

DETAILED DESCRIPTION OF THE DRAWINGS

Figure 5:
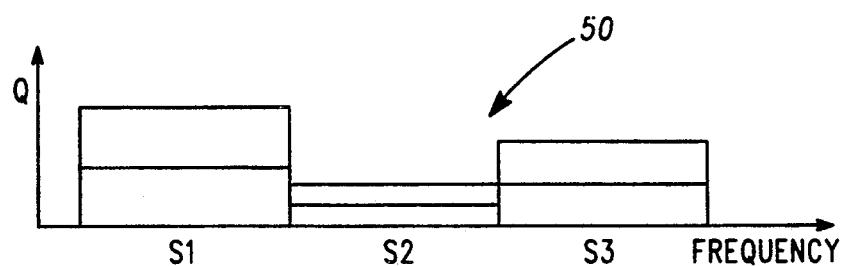
FIG. 5 is a graph representing a spread spectrum communication scheme illustrating the present invention.

Referring initially to the graph, generally designated 10, of FIG. 1, a prior art FDMA communication scheme is illustrated. In FIG. 1, the abscissa is assigned the frequency values and the ordinate is assigned the amplitude value. A plurality of signals 12 are illustrated on graph 10. Ideally, each signal would be in a distinct frequency range 11. A transmitter/receiver pair would be tuned to frequency range 11 and only receive the signal within that range.

In FIG. 2, a graph, generally designated 20, representing a prior art spread spectrum communication scheme is illustrated. In a spread spectrum system, communication between two units is accomplished by spreading each signal over the frequency band of the channel. Each signal is spread with a unique user spreading code. This is illustrated in graph 20 by taking the energy of each of the separate signals and distributing it over the entire channel The height of 12' is indicative of the received power level In the abstract illustration of FIG. 3, one of the signals has been reconstructed. As shown, because the other signals are distributed over the same frequency range as the reconstructed signal, there is some interference (represented by the cross-hatched area). However, the spread spectrum scheme is designed such that a reconstructed signal 12 will exceed the noise from other signals by enough that the quality of signal 12 will not be degraded.

In order to maximize the number of users for the spread spectrum scheme, it is desirable to have each of the signals at the same power level from the stand point of the receiver (cell site). An example of a cell site, generally designated 40 within a cellular system, is provided in FIG. 4. Site 40 consists of a boundary 41, a base site 42, and users 43$a$ and 43$b$. As shown, the distance from user 43$a$ to base site 42 is greater than the distance from user 43$b$ to base site 42. Therefore, if both users were operating at the same power level, the signals received at base site 42 may be much greater for user 43$b$ because of its closer proximity.

As stated previously, in order to maximize the number of users for the spread spectrum scheme, it is desirable to have signals of equal power received at base site 42. Since the weakest signal will generally be the signal furthest from base site 42, all other signals would be brought down to user 43a's power level.

In one method of operation, base site 42 sends out a control signal to the communication unit of user 43b. This control signal directs user 43b's unit to reduce its power. The problem here is that, in the extreme, user 43b may have to reduce the power of its unit by as much as 80 dB. This degree of power reduction is very difficult to achieve and cost prohibitive in the design of the subscriber communication unit.

In order to address this problem and reduce the power variance (adjustability) needed, the present invention is provided as a solution. In essence, the present invention will divide the communication spectrum into two or more channels; with each channel being assigned to a signal based upon the signal's power. A graphical example of this is provided in a graph of a spread spectrum scheme (e.g. CDMA), generally designated 50, in FIG. 5. The channel of FIG. 2 has now been divided into three channels S1-S3. Each channel has a plurality of signals having approximately the same amount of power within each segment. In this example, channel S1 has the highest power signals, then channel S3. Channel S2 contains the signals having the lowest power level.

Placing this in practice can be illustrated in the cell site, generally designated 60, of FIG. 6. Here, cell 60 is shown with secondary boundary lines 41a and 41b. It should be noted here that this example is based upon the assumption that the signals from units closer to base 42 are stronger than those from units further away. Since propagation anomalies and units having different power output levels will occur, this is not always necessarily the case in practice.

Comparing the scheme of FIG. 5 with the cell site of FIG. 6, units transmitting within the area inside boundary 41b would be placed in the S1 channel, since these would be the strongest signals. Signals from units between the 41a and 41b boundary lines would be placed in channel S3; and signals from units outside the 41a boundary would be placed in channel S2. Therefore, user 43b's signal would be placed in channel S1 and user 43a's signal would be placed in channel S2.

In using this scheme, the user's power output can be centered in it's dynamic power control range. As the unit traverses the cell's coverage area, the user's power output may reach it's power control upper limit. If the received power level dropped below this level, the user would be shifted to a channel having a lower received signal strength threshold. Likewise, a user's power may reach it's power control lower limit. In this situation the unit would be shifted to a channel having a higher received signal strength threshold. As a result, rather than requiring a power range in the 80-90 dB range, a range of 20-30 dB would be sufficient.

As explained above, the preceding discussion was under the assumption that closer units provide higher power signals as opposed to those units further away. In actual practice, the power levels need not be based upon a geographic breakdown, as shown in FIG. 6, but could be based upon the power of the received signal. For example, the signal from user 43a may be powerful enough that the system would place this signal in area S3. Alternatively, the signal from user 43b may be very weak (e.g. because it is in a building or obstructed by an obstacle) causing the system to place that signal in channel S2.

There are several methods for determining the appropriate channel for a particular user. In one method, which has been described above, the cell site—based on measured received power level from the user—would select a channel having a received signal strength threshold level within the subscriber's power control range. In another method, the cell site will transmit received signal strength threshold information for each channel available at the base site and the current power level setting for the base control channel. The subscriber's unit would then measure the control channel received power level and calculate the power loss. A channel having a receive power level that will place the subscriber's unit transmit power within its dynamic range would then be selected. The choice of method used depends on the state of the current subscriber. The first method is most appropriate for placing the unit within it's power control range within the cell when established communications are in progress or when the unit is handed off to another cell in a system. The second method is more appropriate for the initial access of the subscriber to the system at the start of a communication session.

Once the initial channel assignment has been made, the transmit power of the subscriber unit can be adjusted as needed to keep the signal received at the site at or near the appropriate received signal strength threshold. If, for example, the subscriber is moving closer to the site and is unable to reduce its transmit power by enough to maintain the appropriate received signal strength, then the signal can be moved from one channel to another having a higher received signal strength threshold.

Figure 9:
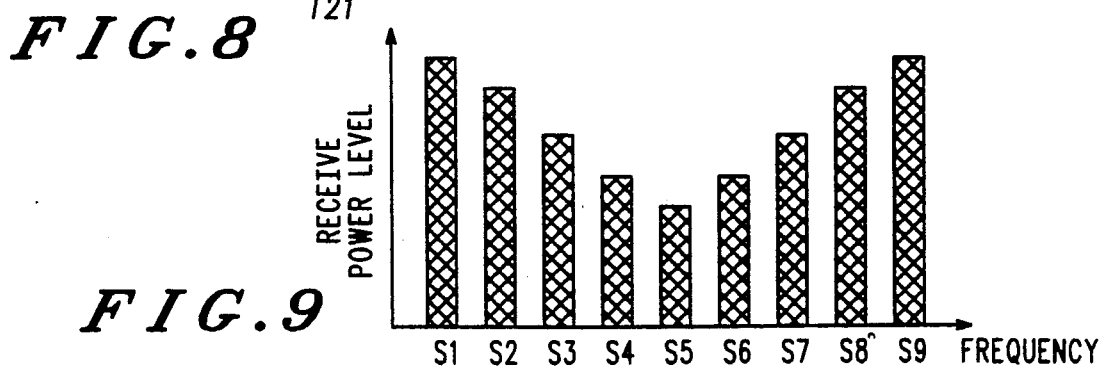
FIG. 9 is a graph representing one method for assigning received signal strength thresholds in a spread spectrum communications.

In the practical implementation of the spread spectrum communication system of FIG. 5, it is highly desirable to set the thresholds for adjacent channels such that they do not differ drastically from each other. It will be apparent to those experienced in the art that having different thresholds imposes additional requirements of limiting sideband energy from modulated signals in adjacent channels; and improved filtering requirements in receivers to protect signals on the desired channel from adjacent channel signals that are at higher received power levels. FIG. 9 depicts one method of arranging the thresholds to reduce interference from stronger adjacent channel signals. Since it is generally unknown what interference can be expected from services in adjacent frequency bands, organizing according to FIG. 9 (e.g. establishing high power threshold levels for channels s1 and s9 which are next to the system band edges) will make these channels less susceptible to the interference. The more vulnerable channels s4–s6 which have the lowest power level thresholds are centered in the system where adjacent channel interference is controlled by the system.

Figure 7:
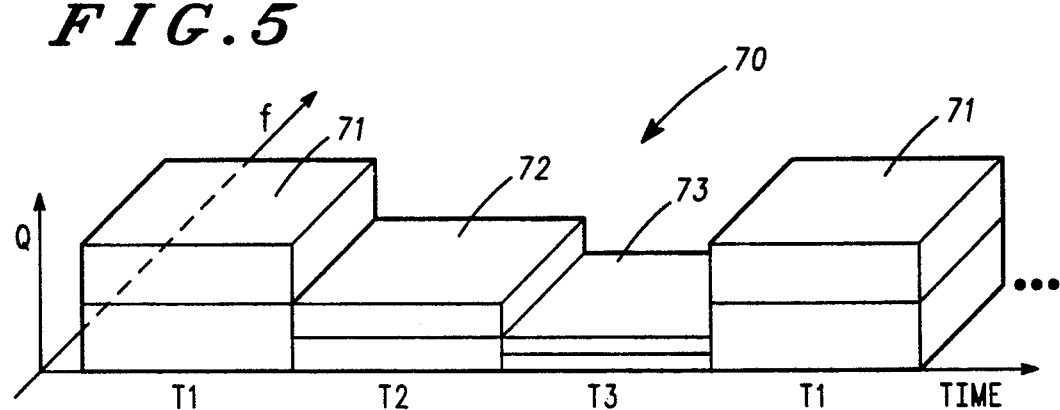
FIG. 7 is a graph representing another spread spectrum communication scheme illustrating the present invention.

Referring now to FIG. 7, a graph, generally designated 70, representing another spread spectrum communication scheme illustrating the present invention is provided. In graph 70, a spread spectrum scheme such as described in conjunction with FIG. 5 is applied in a TDMA fashion to one spread spectrum channel. In graph 70, the ordinate value is now time as opposed to frequency. Here, a particular frequency has been divided into time slots $T_1-T_3$, 71–73 respectively. Each time slot is a time division channel and is assigned a particular power level. When a communication signal is received at the base station, depending upon the power of the received signal, it is assigned to a particular time division channel, 71-73. Again, the signal may be controlled by the base station to increase/decrease power to more appropriately match the power level of the time division channel in which it is being placed.

Figure 8:
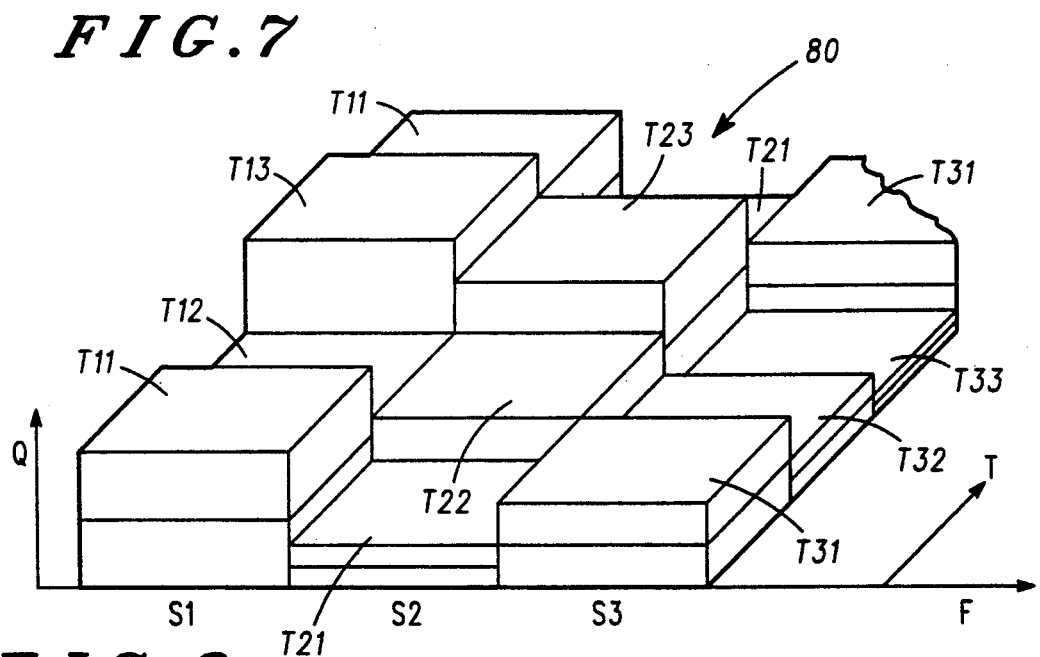
FIG. 8 is a graph representing still another spread spectrum communication scheme illustrating the present invention.

In FIG. 8, a graph, generally designated 80, representing yet another spread spectrum communication scheme illustrating the present invention, is provided. Graph 80 is a three dimensional graph having time added as the third dimension. Graph 80 represents a combination of the schemes of FIGS. 5 and 7. Here, the communication channel has been divided into frequency bandwidth segments S1-S3. Each frequency bandwidth segment has then been divided into time slots $T_{11}$-$T_{33}$. By assigning a different power level to each segment/slot combination, the communication system can assign incoming signals to segment/slot locations which more closely match the incoming signal's power level.

Therefore, it will be clear to one skilled in the art that the instant invention allows the dynamic power control range necessary for a spread spectrum communication system to be greatly reduced. This in-turn permits the use of simpler and less expensive transceiver designs while still maximizing system capacity.

Thus, it will be apparent to one skilled in the art that there has been provided in accordance with the invention, a process and method that fully satisfy the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A communication system comprising:
   a site having a first communication channel associated therewith, said first communication channel having a first received signal strength threshold assigned thereto, and a second communication channel associated therewith, said second communication channel having a second received signal strength, different from said first received signal strength threshold, threshold assigned thereto, said first and second communication channels serving substantially a single coverage area; and
   means for selecting one of said first and second communication channels for use by a subscriber unit.

2. The communication system of claim 1 wherein said subscriber unit comprises said means for selecting and wherein said selection is based upon a signal received from said site.

3. The communication system of claim 1 wherein said first and second communication channels are frequency division channels.

4. The communication system of claim 1 wherein said first and second communication channels are time division channels.

5. The communication system of claim 1 wherein said first and second communication channels are frequency and time division channels.

6. The communication system of claim 1 wherein said communication system is a spread spectrum communication system.

7. The communication system of claim 6 wherein said spread spectrum communication system is a direct sequence code division multiple access communication system.

8. The communication system of claim 6 wherein said spread spectrum communication system is a frequency hopping code division multiple access communication system.

9. A communication system comprising:
   a site having a first communication channel associated therewith, said first communication channel having a first received signal strength threshold assigned thereto, and a second communication channel associated therewith, said second communication channel having a second received signal strength, different from said first received signal strength, threshold assigned thereto, said first and second communication channels serving substantially a single coverage area;
   means for selecting one of said first and second communication channels for use by a subscriber unit; and
   means for adjusting a transmitter power level of said subscriber unit to said received signal strength threshold of said selected communication channel.

10. The communication system of claim 9 wherein said subscriber unit comprises said means for selecting and wherein said selection is based upon a signal received from said site.

11. The communication system of claim 9 wherein said first and second communication channels are frequency division channels.

12. The communication system of claim 9 wherein said first and second communication channels are time division channels.

13. The communication system of claim 9 wherein said first and second communication channels are frequencies and time division channels.

14. The communication system of claim 9 wherein said communication system is a spread spectrum communication system.

15. The communication system of claim 14 wherein said spread spectrum communication system is a direct sequence code division multiple access communication system.

16. The communication system of claim 14 wherein said spread spectrum communication system is a frequency hopping code division multiple access communication system.

17. A method of assigning one of a plurality of communication channels assigned to a single site, each of said plurality of communication channels serving substantially a single coverage area, to a subscriber unit, said method comprising the steps of:
   receiving an information signal at said subscriber unit from said single site, said information signal having information on a received signal strength threshold for each of said plurality of communication channels;
   selecting one of said plurality of communication channels; and
   setting a transmit power level of said subscriber unit such that a signal strength of a signal received at said site from said subscriber unit will match said received signal strength threshold for said selected channel.

18. The method of claim 17 wherein said step of selecting comprising the steps of:

measuring the strength of said information signal received at said subscriber unit;

determining a power power loss of said information signal between the transmission of said information signal from said site to said subscriber unit; and selecting one of said plurality of communication channels based upon a matching of a dynamic power transmission range of said subscriber unit to said received signal strength threshold information for each of said plurality of communication channels.

19. The method of claim 18 wherein said step of determining comprises the steps of:

receiving a transmission power level information from said site; and calculating the difference between said transmission power level information and said strength of said information signal received at said subscriber unit.

20. A method of assigning one of a plurality of communication channels assigned to a single site, each of said plurality of communication channels serving substantially a single coverage area, to a subscriber unit, said method comprising the steps of:

transmitting a request for access to a communication system from said subscriber unit to said single site;

measuring a signal strength of said request at said site;

determining a power loss of said request between the transmission of said request from said subscriber unit to said site;

selecting one of said plurality of communication channels based upon said signal strength of said request and a dynamic power transmission range of said subscriber unit; and setting a transmit power level of said subscriber unit such that a signal strength of a signal received at said site from said subscriber unit will match said received signal strength threshold for said selected channel.

21. The method of claim 20 wherein said step of selecting comprises the step of determining a power loss of said information signal between the transmission of said information signal from said site to said subscriber unit.

22. The method of claim 21 wherein said step of determining comprises the steps of:

receiving a transmission power level information at said site from said subscriber unit; and calculating the difference between said transmission power level information and said strength of said request received at said site.

23. The method of claim 21 wherein said step of determining comprises the step of calculating the difference between a standard transmission power level and said strength of said request received at said site.

24. A communication system comprising:

means for measuring a signal strength of a received signal; and means for selecting a communication channel of a plurality of communication channels, each of said plurality of communication channels serving substantially a single coverage area, within a single site based upon said signal strength of said received signal.

25. The communication system of claim 24 further comprising means for sending said communication channel to a transmitter of said received signal.

26. The communication system of claim 24 wherein said means for measuring a power level comprises a base site.

27. The communication system of claim 24 wherein said communication channel is a time division channel.

28. The communication system of claim 24 wherein said communication system is a spread spectrum communication system.

29. The communication system of claim 28 wherein said spread spectrum communication system is a code division multiple access communication system.

30. The communication system of claim 24 wherein said communication channel is a frequency division channel.

31. The communication system of claim 24 wherein said communication channel is a radio communication signal.

32. The communication system of claim 24 wherein said communication channel is a frequency and a time division channel.

33. A communication system comprising:

means for sending a power level threshold signal for a plurality of communication channel segments, each of said plurality of communication channel segments serving substantially a single coverage area, from a single base site;

means for selecting one of said plurality of communication channel segments based upon said power level threshold signal received by a subscriber;

means for transmitting a first signal in an access channel of said selected one of said plurality of communication channel segments from said subscriber to said base site; and means for selecting a communication channel within said selected one of said plurality of communication channel segments.

34. The communication system of claim 33 further comprising a means for sending said communication channel from said base site to said subscriber.

35. The communication system of claim 33 wherein each of said plurality of communication channel segments has associated therewith a received signal strength threshold.

36. The communication system of claim 35 wherein a first end communication channel segment of said plurality of communication channel segments has a first power level associated therewith, a second end communication channel segment of said plurality of communication channel segments has a second power level associated therewith, and a center communication segment of said plurality of communication channel segments disposed between said first and second ends of said plurality of communication channel segments wherein a power level of said center communication segment is less than said power levels of said first and second end communication segments.

37. A method of reducing a subscriber transmit power control range in a communication system having a base site and a subscriber, said method comprising the steps of:

measuring a signal strength of a signal received at said base site from said subscriber; and selecting a communication channel of a plurality of communication channels, each of said plurality of communication channels serving substantially a single coverage area, within a single cell based upon said signal strength.

38. The method of claim 37 further comprising the step of sending said communication channel to said subscriber.

* * * * *